May 4, 1926.
W. K. MILLER ET AL
TRUCK BRAKE
Filed Jan. 27, 1923
1,583,413
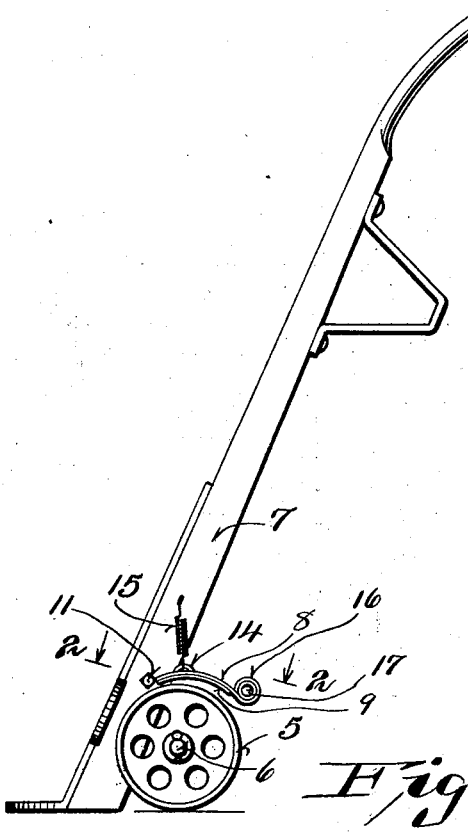
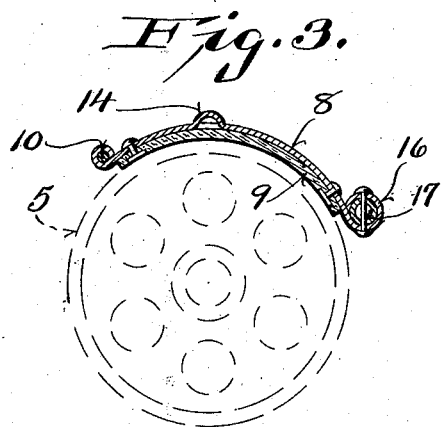
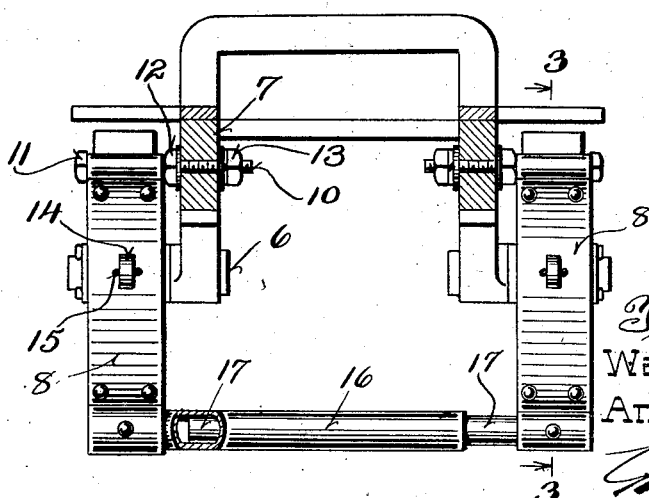
Inventors
Walter K. Miller
Anslem N. Steinborg Patented May 4, 1926.

UNITED STATES PATENT OFFICE.

WALTER K. MILLER AND ANSLEM N. STEINBORG, OF APPLETON, WISCONSIN.

TRUCK BRAKE.

Application filed January 27, 1923. Serial No. 615,406.

*To all whom it may concern:*

Be it known that we, WALTER K. MILLER and ANSLEM N. STEINBORG, both citizens of the United States, and residents of Appleton, in the county of Outagamie and State of Wisconsin, have invented certain new and useful Improvements in Truck Brakes; and we do hereby declare that the following is a full, clear, and exact description thereof.

Our invention relates to a brake of new and improved construction, which is adapted to be applied to the usual type of freight truck to hold the wheels thereof against movement while the load is being raised or lowered.

One important object of the invention it to provide a construction whereby the same may be attached to trucks of different sizes and may be readily adjusted so as to bring the brake shoes into operative relation to the wheels.

A further object of the invention is to simplify the construction of devices of this nature whereby the cost of manufacture may be reduced to a minimum without sacrificing the efficiency of the device.

With the above and other objects in view, our invention consists in certain details of construction and combinations thereof, which will be fully described in connection with the accompanying drawings and subsequently claimed.

In the drawing:

Figure 1 represents a side elevation of a freight handling truck with our invention applied thereto.

Figure 2 is a sectional plan view taken on the line 2—2 of Figure 1, and

Figure 3 is a detail sectional view taken on the line 3—3 of Figure 2.

Referring more particularly to the drawing, the numeral 5 designates the supporting wheels which are journalled upon pintles 6 secured to the legs 7 of the truck frame, which is of usual construction. The brake shoes 8, which are preferably constructed from spring metal, each have a lining 9 secured to the inner face thereof. The brake shoe is pivoted at one end on a bolt 10, which is provided at its outer end with a head 11 for retaining the shoe and is secured to the leg 7 by a pair of locking nuts 12 and 13. The shoe has an intermediate portion stamped upwardly, as shown at 14, to form a loop to which one end of a contractile spring 15 is secured. The other end of the spring should be secured to the leg 7 in a position to normally support the brake shoe out of contact with the wheel.

It will be understood that similar brake shoes are provided for each wheel and the outer ends of the brake shoes have secured thereto sleeves 16 and 17, respectively which form a telescoping connection with each other, whereby the distance between the two brake shoes may be adjusted to correspond to the width between the wheels of the truck to which the invention is applied.

It will be obvious that the attachment, which embodies the braking device, may be carried in stock separately and may be readily applied to any truck as may be desired. It will, also, be appreciated that the device may be manufactured at a very small cost and be very quickly installed upon the truck.

Whenever the truck is being used to handle heavy freight, the workman in loading or unloading the same may, by placing his foot on the rod, or sleeve, 16, depress the same and bring both brakes simultaneously into operative relation to the truck wheels 5, thus effectively preventing any displacement thereof while the freight is being raised or lowered.

It will, also, be understood that while we have shown and described specifically one embodiment of our invention, various modifications may be made in the structural details and the material without departing from the scope of the invention as claimed.

We claim:—

An attachment for wheeled trucks comprising a pair of brake shoes, means for pivotally attaching the same to the frame of a truck so as to overhang the wheels, each of said brake shoes consisting of a curved metal strap having rolled ends and an intermediate portion punched out to form a loop, a tube rigidly secured within the rolled end of one of said straps, a rod rigidly secured within the rolled end of the other of said straps and telescopically fitting said tube and contractile springs secured to said loops and frame to yieldably hold said shoes away from the wheels.

In testimony that we claim the foregoing we have hereunto set our hands at Appleton, in the county of Outagamie and State of Wisconsin.

WALTER K. MILLER.
A. N. STEINBORG.